E. & E. D. DITHRIDGE.

Lamp Chimney.

No. 4,182. Reissued Nov. 22, 1870.

Witnesses:

Chas Jacobs

J. W. White

Inventors:

E. & E. D. Dithridge

For.

T. H. Alexander

Atty

N. PETERS, Photo-Lithographer, Washington, D. C.

United States Patent Office.

EDWARD DITHRIDGE AND EDWARD D. DITHRIDGE, OF PITTSBURG, PENNSYLVANIA.

Letters Patent No. 33,428, dated October 8, 1861; reissue No. 4,182, dated November 22, 1870.

IMPROVEMENT IN LAMP-CHIMNEYS.

The Schedule referred to in these Letters Patent and making part of the same.

*To all whom it may concern:*

Be it known that we, EDWARD DITHRIDGE and EDWARD D. DITHRIDGE, of Pittsburg, in the county of Allegheny and State of Pennsylvania, have invented certain new and useful Improvements in Lamp-Chimneys; and we do hereby declare that the following is a full, clear, and exact description thereof, references being had to the accompanying drawings and to the letters of reference marked thereon which form a part of this specification.

The nature of our invention consists in making a lamp-chimney with a flattened bulb or bulge adapted to flat wicks, so as to bring the corners of the flame as near as possible the same distance from the glass as the broad side of the wick.

Figure 1:
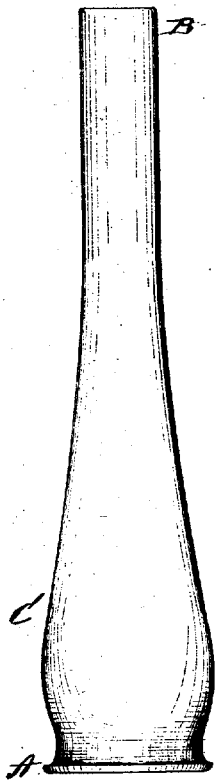
Figure 2:
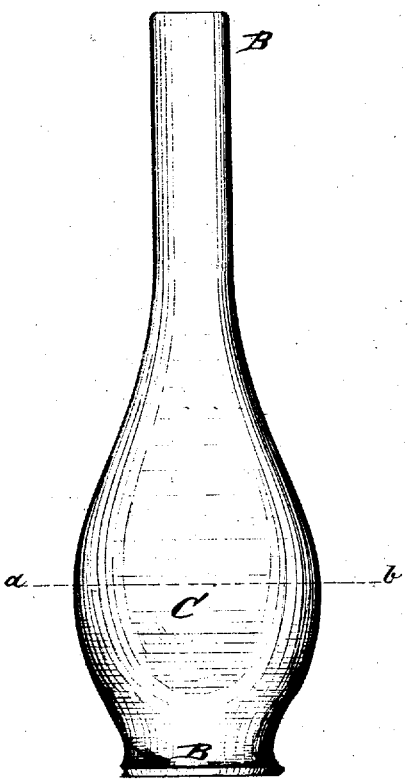

In order to enable others skilled in the art to which our invention appertains to make and use the same, we will now proceed to describe its construction and operation, referring to the annexed drawings, in which Figure 1 is a side view, and Figure 2 is a front view of our chimney.

Figure 3:
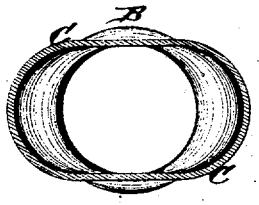

Figure 3 is a horizontal section, through line *a b*, fig. 2.

A represents the base, and

B, the top of our chimney.

C is the body of the chimney, which bulges out and is flattened so that the two sides of the chimney are parallel, or nearly parallel, with the wick and flame.

The exact shape of this bulge or bulb is immaterial, that being merely a matter of taste; but our invention is in the flattened shape, so as to bring the corners or extreme edges of the flame as near the same distance from the glass as the broad side of the flame, and thus make a more equal heating up or expansion of the chimney, instead of leaving a large current of cold air passing up the flat side of the flame, while the corners of the flame were close to the glass, heating up the chimney very fast at that point, and causing unequal expansion in the round chimney. This unequal expansion is the main cause of the breaking of chimneys.

All glass-makers know that glass requires to be heated up as nearly alike in all parts as possible, to make the expansion as regular as possible, otherwise the parts that are heated are liable to fly or break away from the cooler portions.

By the flattened bulb of our chimney we accomplish the so necessary equal heating up or expansion of the chimney, as all parts of the bulb are about at equal distance from the flame.

Having thus fully described our invention,

What we claim as new, and desire to secure by Letters Patent, is—

1. A lamp-chimney having a flattened bulb, substantially as set forth.

2. A lamp-chimney having a round top and base and a flattened oval-shaped bulb, substantially as set forth.

In testimony that we claim the foregoing as our own, we affix our signatures in presence of two witnesses.

EDWD. DITHRIDGE.
E. D. DITHRIDGE.

Witnesses:
JOS. A. BUTLER,
J. B. GRAHAM.